United States Patent [19]
Harris

[11] 4,072,903
[45] Feb. 7, 1978

[54] STORAGE CIRCUIT FOR PAGING RADIO RECEIVERS

[75] Inventor: Raymond W. Harris, Rustburg, Va.

[73] Assignee: General Electric Company, Lynchburg, Va.

[21] Appl. No.: 749,390

[22] Filed: Dec. 10, 1976

[51] Int. Cl.$^2$ .......... H04M 11/02

[52] U.S. Cl. .......... 325/466; 340/311; 325/64; 325/55

[58] Field of Search .......... 325/466, 364; 179/18 BF, 18 BG; 340/164 R, 164 B, 164 A, 311, 312; 325/64, 55

[56] References Cited

U.S. PATENT DOCUMENTS

| | | | |
|---|---|---|---|
| 3,510,864 | 5/1970 | McDonald | 340/311 R |
| 3,742,481 | 6/1973 | Nickerson | 340/311 |
| 3,808,538 | 4/1974 | Goransson et al. | 325/64 |
| 4,010,460 | 3/1977 | Derosa | 325/64 |

*Primary Examiner*—Robert L. Griffin
*Assistant Examiner*—Tommy P. Chin
*Attorney, Agent, or Firm*—James J. Williams

[57] ABSTRACT

Conventional paging receivers are provided with a circuit which, when a predetermined paging signal is received, produces an audible sound that alerts the user that he is being paged. The audible sound continues until the page is completed or until the user presses a reset button. In some situations, the audible sound is undesirable or unacceptable. This invention includes a switch which, in a store position, prevents the receiver from producing an audible sound when a paging signal is received. An associated circuit stores or registers the paging signal. When the switch is returned to its normal position, the audible sound is produced. A lamp may be included to indicate that a paging signal is received.

9 Claims, 2 Drawing Figures

STORAGE CIRCUIT FOR PAGING RADIO RECEIVERS

BACKGROUND OF THE INVENTION

My invention relates to a paging radio receiver, and particularly to a paging radio receiver which can selectively produce an audible sound when a paging signal is received or store a paging signal when received without producing an audible sound.

Paging radio receivers are used extensively for indicating to a selected user that the user is being sought. Typically, a code (that is predetermined and unique for each user) is indicated by tones or pulses or some other type of signal which can be transmitted by a radio frequency carrier. When a carrier is demodulated and the code reproduced, the characteristics of the code cause a particular radio receiver to provide an indication, usually in the form of an audible sound. The person hearing the sound then knows that he or she is being paged and can call an office, or go to a specified location, or perform some other function. On occasions, the audible sound may be undesirable or unacceptable. For example, a doctor with a patient would not want to be distracted or interrupted by an audible sound indicating a page. But later, the doctor would want to know if a page had been received.

Accordingly, a primary object of my invention is to provide a new and improved paging radio receiver with means for storing a paging signal without producing an audible sound.

Another object of my invention is to provide a new and improved paging radio receiver with relatively simple and reliable means for storing a paging signal without an audible sound, and with a switch which can be operated at any time later to indicate whether or not a paging signal has been previously received.

A fairly specific object of my invention is to provide a new and improved paging radio receiver with a switch having a normal position that permits an audible sound to be produced when a paging signal is received, having a store position for storing a paging signal when received and without producing a sound, and for producing an audible sound when the switch is operated from its store position to its normal position.

SUMMARY OF THE INVENTION

Briefly, these and other objects are achieved in accordance with my invention by a paging radio receiver which produces a paging signal in response to a predetermined code received by the receiver. A latch circuit produces a latched signal in response to the paging signal. Audible sound producing means are connected to the receiver and produce an audible sound if signals are present at two inputs at the same time. The paging signal is applied to the first input. A switch having normal and store positions is provided. In the normal position, the switch supplies the latched signal to the second input, and if the paging signal is present at the first input, a sound will be produced. In the store position, the switch supplies the latched signal to storage means at the first input. When the switch is switched from the store position to the normal position, the stored signal at the first input and the latched signal at the second input causes the audible sound to be provided. A lamp may be connected to the latch circuit to visually indicate a latched signal (caused by a paging signal).

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF A PREFERRED EMBODIMENT

Figure 1:
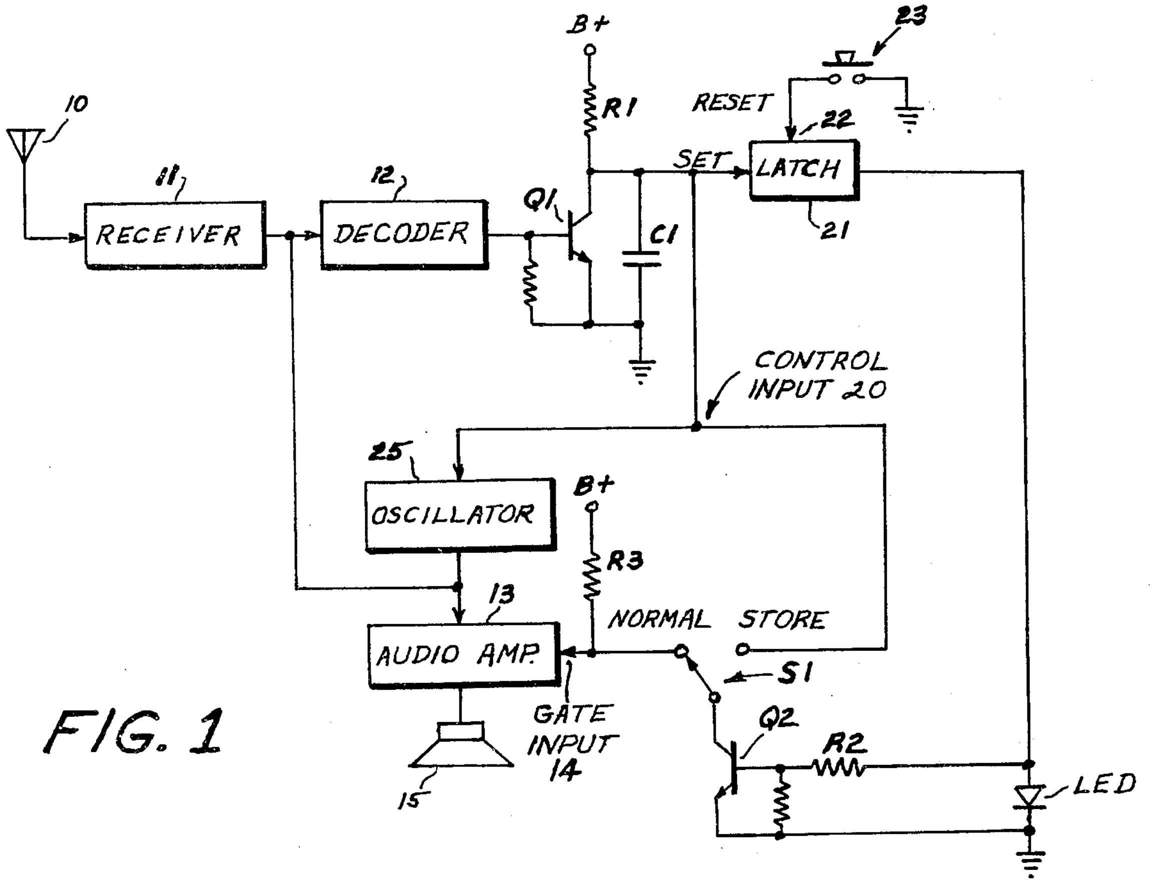
FIG. 1 shows a diagram of a preferred embodiment of my paging receiver.

As shown in FIG. 1, a typical paging receiver includes an antenna 10 which senses radio frequency signals and applies these signals to a receiver 11. The receiver 11 may comprise one or more stages of RF amplification, a detector or demodulator, and one or more stages of audio amplification. The detector or demodulator may be for frequency modulated or amplitude modulated signals. The detected or demodulated signals are applied to a decoder 12 and to an audio amplifier 13. The audio amplifier 13 has a gate input 14 which, as will be explained, must be at a predetermined voltage (for example zero) before the audio amplifier 13 can pass audio signals to a loudspeaker 15 to produce audible sounds.

The decoder 12 may take a number of forms, depending upon the type of code being transmitted on the radio frequency carrier to the receiver 11. Such codes may include a sequence of audio frequency tones or binary pulses or some other type of code. The decoder 12 is arranged to sense a unique and predetermined code for its associated receiver. When such a predetermined code is received, the decoder 12 produces a signal at its output which I have assumed to be a high or positive signal. This positive signal is applied to the base of an input transistor Q1 whose collector is connected through a resistor R1 to a positive source of d.c. voltage B+ and whose emitter is connected to ground or a point of reference potential. In the absence of a proper code at the input to the decoder 12, the transistor Q1 is turned off and its collector voltage is high or positive. When the proper code is recognized by the decoder 12, the transistor Q1 is turned on and its collector voltage becomes low or zero (which is a paging signal or indication). The collector is connected to a control input 20 and to the set input of a latch circuit 21. A storage capacitor C1 is connected between the control input 20 and ground. The latch circuit 21 may be any suitable circuit such as a bistable multivibrator which is placed in the set or latched condition when a low or zero voltage is applied to its set input. The latch circuit 21 may be reset by grounding the reset input 22 with a push button 23. When the latch circuit 21 is set, its output is at a positive voltage; when the latch circuit 21 is reset, its output is at a low or zero voltage.

The control input 20 is connected to an oscillator 25 to control the operation of the oscillator 25. When the control input 20 is at a positive voltage, the oscillator 25 is turned off; and when the control input 20 is at a low or zero voltage, the oscillator 25 is turned on. The output of the oscillator 25 is also applied to the input of the audio amplifier 13.

The output of the latch circuit 21 is applied through a resistor R2 to the base electrode of a second transistor Q2, and may also be to a light emitting diode LED. An ordinary incandescent lamp may be used instead. The light emitting diode LED is desirable where a user wishes to get a visual indication of a received page. When the latch circuit 21 is set, its positive output energizes the light emmitting diode LED to provide illumination, and also turns on the transistor Q2. When the transistor Q2 is turned on, its collector is at a relatively low or zero voltage. The collector is connected through the movable arm of a switch S1 to one of two contacts indicated as normal and store respectively. The normal contact is connected through a resistor R3 to the positive source B+, and to the gate input 14 of the amplifier 13. The store contact is connected to the control input 20. When the movable arm is connected to the normal contact and the transistor Q2 is turned on, its low or zero collector voltage renders the audio amplifier 13 operative so that it will pass signals therethrough. When the transistor Q2 is off, its high collector voltage renders the audio amplifier 13 inoperative so that no audio signals are passed or produced. When the movable arm of the switch S1 is connected to the store contact and the transistor Q2 is turned on, the low or zero collector voltage is stored by the capacitor C1 to provide a function in accordance with my invention as will be explained.

Figure 2:
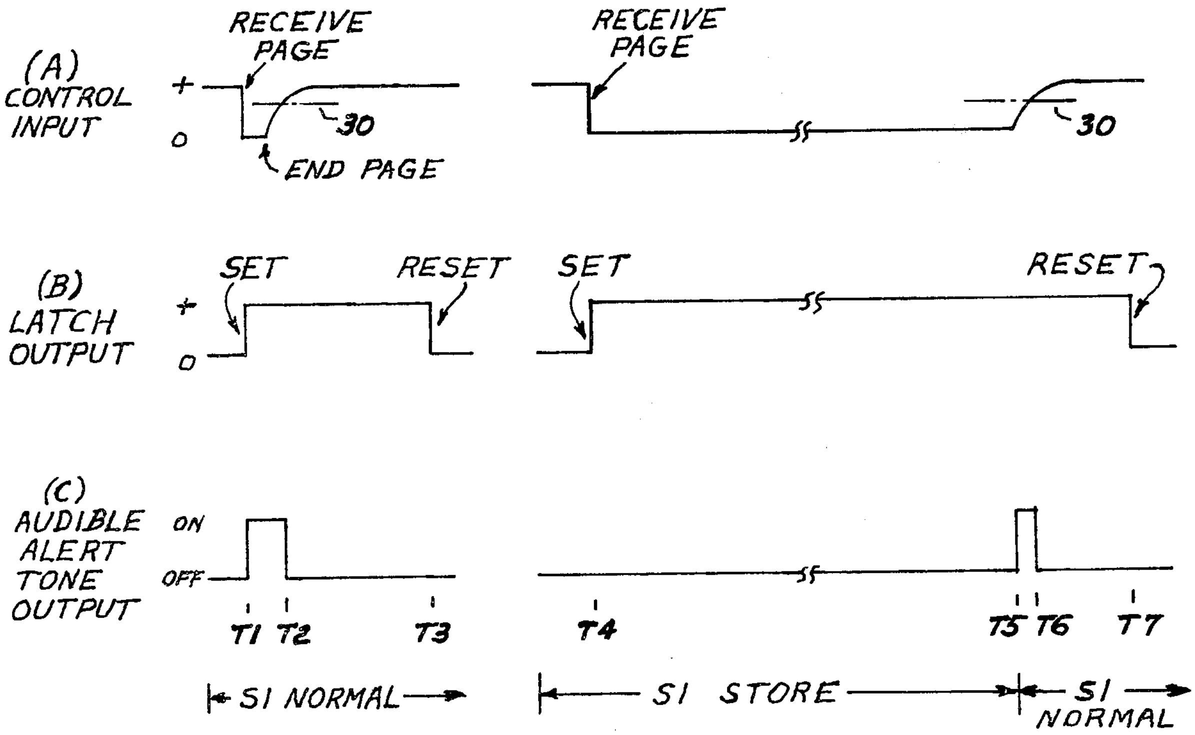
FIG. 2 shows wave forms for illustrating the operation of my paging receiver.

The operation of my circuit of FIG. 1 is explained in connection with the wave forms shown in FIG. 2. In FIG. 2 the left hand set of wave forms illustrates the operation of my circuit when the switch S1 is in its normal position, and the right hand set of waveforms illustrates the operation of my circuit when the switch S1 is first in the store position and then put into the normal position.

With respect to the left hand set of wave forms for the switch S1 in the normal position, I have assumed that a signal having the proper code for the receiver 11 is received at the time T1. This signal is decoded by the decoder 12 which produces a positive signal at its output. The transistor Q1 is turned on heavily (almost saturated), so that its collector goes to a very low or zero voltage as indicated in the wave form of FIG. 2A at the time T1. This quickly discharges the positive voltage on the capacitor C1 so that the control inpt 20 goes to a low voltage. This sets the latch 21 which produces a positive latched output as indicted in FIG. 2B. This positive output turns on the transistor Q2 so that the gate input 14 of the amplifier 13 becomes low and the amplifier 13 can pass audio signals. When the control input 20 became low or zero, it caused the oscillator 25 to become operative and produce an alert tone or audible signal (such as a 1000 hertz tone). This oscillator output is amplified and passed by the amplifier 13 so that an audible sound or signal is provided by the loudspeaker 15. This is illustrated in FIG. 2C which shows the audible tone going from an off to an on condition. Shortly after the time T1, the paging code ends, and the output of the decoder 12 goes to a low value again. This turns the transistor Q1 off, so that the capacitor C1 begins to charge toward the positive voltage B+. When this charge reaches a predetermined magnitude as indicated by the threshold line 30 in FIG. 2A, the control input 20 becomes sufficiently positive to cause the oscillator 25 to be turned off. This occurs at the time T2, so that the alert tone goes from an on to an off condition as shown in FIG. 2C. The capacitor C1 continues to charge toward the voltage B+ which is reached some time after the time T2. However, the latch 21 is still set so that its positive latched output causes the diode LED to remain illuminated. Thus a user will know that he has received a page, even if he did not hear the audible sound. This positive latched output also keeps the transistor Q2 turned on so that the audio amplifier 13 can pass signals. Such signals may, in some types of paging systems, include an audio command connected directly from the receiver 11 to the input of the audio amplifier 13. Once a user has received all of the information desired from a particular paging call, he may then push his reset button 23, as indicated at the time T3. This causes the latch 21 to be reset so that its output goes to zero again. This extinguishes the diode LED, and turns off the transistor Q2. Thus, the amplifier 13 can not pass audio signals, but the receiver is ready to receive another page.

As mentined earlier, it is sometimes necessary or preferable that a paging receiver produce no audible sound when a page is received. However, a user should, at some later time, be able to determine whether he did in fact receive a page. In such instances, this can be achieved in accordance with my invention by moving the arm of the switch S1 to the store contact. The operation of my circuit under these conditions is shown in the right hand set of wave forms of FIG. 2. When a paging signal of the proper code is received at the time T4, the transistor Q1 is turned on and the control input 20 goes from a positive to a zero value as shown in FIG. 2A. The latch 21 is set and its latched output becomes positive as shown in FIG. 2B. This turns the transistor Q2 on, (current flows from the source B+ through the resistor R1), so that the control input 20 remains at a low or zero voltage regardless of the subsequent termination of the paging signal. Thus, the capacitor C1 is held discharged, and the oscillator 25 is turned on or energized. However, the transistor Q2 is no longer connected to the normal contact, so that the gate input 14 of the amplifier 13 is at a relatively positive voltage B+. This blocks the amplifier 13 so that it can not pass the signals produced by the oscillator 25. If the diode LED is used, the set condition of the latch 21 causes illumination of the diode LED, so that a user will realize that a page is received. After some length of time, I have assumed that the user wishes to determine whether his receiver has received a page. To make this determination, the user moves the arm of the switch S1 from its store contact to its normal contact as indicated at the time T5. When this occurs, the capacitor C1 may begin to charge toward the voltage B+ as shown in FIG. 2A. However, until the capacitor reaches the threshold line 30, its relatively low voltage still keeps the oscillator 25 turned on. The set condition of the latch 21 keeps the transistor Q2 on so that the normal contact and the gate input 14 remain at a low or zero voltage. Hence the amplifier 13 can pass these oscillator signals and an audible sound is heard as shown in FIG. 2C. At the time T6, the capacitor voltage reaches the threshold voltage indicated by the line 30 so that the oscillator 25 is turned off. This stops the audible sound. The capacitor C1 continues its charge until it reaches the voltage B+. Having been alerted or prompted that a page was received, the user may then reset his pager by operating the reset button 23 at the time T7. This turns off the transistor Q2. With the arm of the switch S1 engaging the normal contact, the paging receiver is ready to receive another page. It will be noted that the interval (between the time T5 and the time T6) when the audible tone is on after a page was stored is less than the interval (between the time T1 and the time T2) when the audible tone is on for a normal operation. This is because the paging signal has some finite length of time which keeps the transistor Q1 turned on for about the same length of time, and prevents the capacitor C1 from charging immediately. However, the resistor R1 and capacitor C1 can be increased so that the time the oscillator 25 is kept on for a stored page can be increased.

It will be seen that my invention provides a relatively simple arrangement for storing a page by means of a simple switch and storage capacitor. While I have shown only one embodiment, this may be modified as persons skilled in the art will appreciate. The receiver 11 and decoder 12 may take numerous forms. The latch 21 may be any suitable circuit, preferably one that can be small and compact. The diode LED may take other forms, such as a small lamp, or may be omitted. Other storage devices may replace the capacitor C1. The oscillator 25 may take any form which provides the desired audible sound. And finally various voltages and polarities may be used to obtain the indicated functions. Therefore, while I have described my invention with reference to a particular embodiment, it is to be understood that modifications may be made without departing from the spirit of the invention or from the scope of the claims.

What I claim as new and desire to secure by Letters Patent of the United States is:

1. An improved paging receiver circuit comprising:

a. first means for connection to said receiver and having an output for producing a paging signal in response to a predetermined signal received by said receiver;

b. a latch having an input connected to said first means output, and having an output for producing a latched signal in response to said paging signal;

c. audio means having a control input connected to said first means output, having a gate input, and having an output, said audio means producing an audible signal at said output in response to the presence of said paging signal or said latched signal at said control input and in response to said latched signal at said gate input;

d. switching means connected to said latch output for selectively supplying said latched signal to said gate input or said control input of said audio means;

e. and second means connected to said control input of said audio means for causing said audio means to produce an audible sound in response to said switching means transferring said latch output from said control input of said audio means to said gate input of said audio means.

2. The improved paging receiver circuit of claim 1 wherein said second means comprise a storage device for maintaining said latched signal at said control input of said audio means for a predetermined time following transfer of said latch output from said control input of said audio means to said gate input of said audio means.

3. The improved paging receiver circuit of claim 2 and further comprising visual indicator means connected to said latch output and being rendered operative in response to said latched signal.

4. A circuit for selectively causing a paging receiver to produce an audible sound in response to a paging signal substantially at the time received or for causing said paging receiver to store the reception of said paging signal and produce an audible sound at a later time comprising:

a. first means for producing a first signal in response to said receiver receiving a paging signal;

b. latch means connected to said first means and having an output for producing a latched signal in response to said first signal:

c. audible sound producing means having a first input connected to said first means, having a second input, and having an output, said sound producing means producing an audible sound signal in response to the presence of said first signal or said latched signal at said first input and said latched signal at said second input at the same time;

d. signal storage means connected to said first input of said audible sound producing means for storing said latched signal for a predetermined time following removal of said latched signal;

e. and switching means connected to said latch means output for selectively applying said latch output to said second input of said audible sound producing means and thereby cause production of said audible sound in response to said first signal and said latched signal at the same time; or for selectively applying said latch output to said first input of said audible sound producing means and storing said latched signal in said signal storage means, and thereby cause production of said audible sound in response to said switching means being switched to apply said latched signal to said second input of said audible sound producing means.

5. The circuit of claim 4 and further comprising visual indicator means connected to said latch means for producing a visual indication in response to said latched signal.

6. The circuit of claim 4 wherein said audible sound producing means comprise an oscillator and loudspeaker.

7. The circuit of claim 4 and further comprising means connected to said latch means for manually resetting said latch means.

8. An improved paging radio receiver for indicating a page when received and for storing a page when received and subsequently indicating said stored page, comprising:

a. first means responsive to a predetermined paging code for producing a paging signal;

b. second means connected to said first means for producing a continuous signal in response to said paging signal, said second means having manual resetting means for terminating said continuous signal;

c. audible indicating means having a control input connected to said first means and a gate inpt, said audible indicating means producing an audible sound in response to a control signal at said control input and a gate signal at said gate input at the sme time;

d. signal storage means connected to said control input of said audible indicating means for storing signals thereat for a predetermined time;

e. and a switch connected to said second means for alternatively applying said continuous signal to said gate input of said audible indicating means if a page is to be indicated when received, and for applying said continuous signal to said storage means if a page is to be indicated at a later time by connecting said continuous signal to said gate input.

9. The improved paging radio receiver of claim 8, and further comprising visual indicating means connected to said second means for providing a visual indication in response to said continuous signal.

* * * * *

UNITED STATES PATENT OFFICE

CERTIFICATE OF CORRECTION

Patent No. 4,072,903 Dated February 7, 1978

Inventor(s) Raymond W. Harris

It is certified that error appears in the above-identified patent and that said Letters Patent are hereby corrected as shown below:

Col. 3, line 46, cancel "inpt" and insert -- input --

Col. 4, line 19, cancel "mentined" and insert -- mentioned --

Col. 6, line 49, cancel "inpt" and insert -- input --

Col. 6, line 52, cancel "sme" and insert -- same --

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*